United States Patent [19]

Nickles

[11] 4,058,728
[45] Nov. 15, 1977

[54] CORRECTION OF DATA LOSS IN GAMMA RAY SCINTILLATION CAMERAS

[75] Inventor: Robert J. Nickles, Madison, Wis.

[73] Assignee: Wisconsin Alumni Research Foundation, Madison, Wis.

[21] Appl. No.: 690,651

[22] Filed: May 27, 1976

[51] Int. Cl.² ............................................. G01T 1/20
[52] U.S. Cl. .............................. 250/369; 250/363 S
[58] Field of Search .................... 250/363 S, 366, 369; 330/2

[56] References Cited

U.S. PATENT DOCUMENTS

| | | | |
|---|---|---|---|
| 2,957,988 | 10/1960 | Fearnside | 330/2 |
| 3,475,748 | 10/1969 | Price et al. | 330/2 |
| 3,732,420 | 5/1973 | Brunnett et al. | 250/363 S |

Primary Examiner—Harold A. Dixon

Attorney, Agent, or Firm—Howard W. Bremer; Harry C. Engstrom; Theodore J. Long

[57] ABSTRACT

A method of and circuitry for correcting gamma ray camera data signals for signal processing circuitry is disclosed. Pulses are artificially generated which replicate the data signals produced at the output of photomultiplier tubes of the gamma ray scintillation camera and are inserted in the gamma ray camera internal processing circuitry in such a manner as to remain distinguishable from the data signals generated by the photomultiplier tubes. By monitoring the number of artificial pulses produced artificially and the number of such pulses actually counted by the data processing circuitry of the gamma scintillation camera, a factor indicative of the losses of scintillation count in the processing circuitry may be determined.

12 Claims, 8 Drawing Figures

CORRECTION OF DATA LOSS IN GAMMA RAY SCINTILLATION CAMERAS

BACKGROUND OF THE INVENTION

The invention described herein was made in the course of work under a grant or award from the Department of Health, Education, and Welfare.

This application is a continuation-in-part of copending U.S. Ser. No. 586,200 and describes an invention that relates in general to systems for monitoring physical phenomena by means of monitoring the number, frequency and magnitude of the occurrence of such phenomena, and that is particularly applied to the data processing circuitry of a gamma ray scintillation camera wherein the frequency, number and intensity of gamma ray scintillations from radioisotopic material in living tissue is used as a diagnostic aid.

DESCRIPTION OF THE PRIOR ART

A number of radioisotope cameras have been developed for viewing the distribution of radiosotope materials in the bodies of humans and other animals. Such cameras record the entire field of view continuously in contrast to the somewhat older technique of scanning the subject point by point. Radioisotope cameras have become commonplace for diagnostic and research purposes and are extensively used in hospitals and research organizations. See e.g. Hal O. Anger, *Radioisotope Cameras,* Chapter 19, Instrumentation in Nuclear Medicine, Academic Press, Inc. 1967.

In particular, the gamma ray scintillation camera has become the most commonly utilized radioisotope camera because of its sensitivity and adaptability. The scintillation camera employs a solid sodium iodide scintillation crystal which gives off a point flash of visible light when a gamma ray impinges upon it. An array of photomultiplier tubes are spaced behind the sodium iodide crystal and perform the function of translating the point flashes of light to a pulse of electric current at the outputs of the photomultiplier tubes. The magnitude of the pulse of output current at each tube in the array is proportional to the amount of light which strikes the tube. The position of a single flash of light in the sodium iodide crystal can be determined by comparing the magnitude of the outputs of each photomultiplier tube in the array, since each photomultiplier tube will receive an amount of light from the flash which depends upon the angle and distance of the point flash from the tube. The outputs of the photomultiplier tube can be combined by means of electronic circuitry to yield output signals which are proportional to the position coordinates of the point of flash of light, and to the intensity of the flash of light. The "picture" seen by the camera may be viewed by utilizing these signals to provide the "X" and "Y" inputs to an oscilloscope, with the electrical signal corresponding to intensity being used to control the electron beam intensity of the oscilloscope. The gamma ray image may be projected upon the sodium-iodide crystal by means of a pinhole collimator, or more commonly, by means of a multi-channel collimator having numerous channels formed in a gamma ray absorber plate.

The output signals from the gamma ray scintillation camera may also be utilized to provide quantitative information in addition to the pictorial display of the density of gamma ray emissions in a subject. This may be accomplished by feeding the outputs of the gamma ray camera to a digital computer for processing. The signals corresponding to the X and Y location of the flash of light, and the signal corresponding to the magnitude of the flash, are digitized before being supplied to the computer. For purposes of the computing scheme, the recording face of the gamma ray camera is commonly divided up into a rectangular grid containing a large number of small rectangular cells. The computer determines, from the input signal supplied to it from the gamma camera, at which cell on the face of the gamma camera the point flash occurred. The computer is capable of counting the number of flashes that occur in each cell over a specified period of time, such as one second, and will maintain this number in the memory of the computer. The computer will then begin counting over again for each cell for another predetermined unit of time to determine the number of point flashes occurring at that cell over that unit of time. It is thus possible to have the computer store the number of gamma point flashes that occurred in any particular cell as a function of time. It is also possible to read out the number of point flashes that occurred in any desired group of cells as a function of time. This procedure is of special value in the examination of dynamically active body organs such as the heart and the kidneys. It is possible, for example, to delineate the area of a gamma ray camera image which corresponds to a ventricle of the heart. The flow of blood containing a radioactive isotope through the ventricle can then be measured by using the computer to determine the change in the number of gamma ray emissions seen by the camera in the area of the ventricle as a function of time. The internal programming of the computer can be utilized to allow selection of the cells that correspond to the ventricular area of the heart.

A particular problem encountered with gamma scintillation cameras, particularly associated with the data processing circuitry, is that the number of scintillations counted per unit time by the processing circuitry is less than the scintillations detected by the photomultiplier tubes. In fact as the frequency or intensity of scintillations encountered by a photomultiplier tube increases, the disparity between the number of actual scintillations encountered by the tube and the number counted by the processing circuitry actually increases.

It therefore appears useful to be able to monitor the losses that occur in the processing circuitry and to correct the data for these losses in order that the information provided by the overall system may thus be increased in accuracy.

SUMMARY OF THE INVENTION

In order to accomplish these objectives, the present invention furnishes a method and circuitry for correcting the data processed by the internal circuitry of a gamma ray scintillation camera for count losses occurring in the internal processing circuitry. Because these losses are a function of the rate as well as the energy magnitude of the scintillations observed by the photomultiplier tubes, the losses may be monitored by producing artificial pulses which are of a high rate of occurrence, which are of a shape corresponding to the shape of pulses produced by the photomultiplier tubes in response to gamma scintillations, and which are variant in amplitude in accordance with the statistical energy distribution for the gamma ray scintillations encountered by the photomultiplier tubes. In this way the actual data is accurately replicated, and the artificial pulses may be monitored to determine the loss of count thereof in the data processing system of the gamma scintillation camera, and the data produced thereby may be corrected for such losses.

The invention provides circuitry which produces a signal that is of a high repetition rate and which is of the general shape of those pulses produced by a photomultiplier tube in response to the scintillation of the radioisotope material in the tissue of the observed organ. To this pulse is added a pulse having an amplitude variation which is statistically similar to the statistical variation of gamma ray scintillation energies observed by the photomultiplier tubes. This artificial signal is applied to the processing circuitry associated with a photomultiplier tube located on the outer or peripheral ring of phototubes of the gamma ray camera. The number of such artificial signals generated in a given time period may be compared to the count of pulses received from the circuitry associated with the peripheral photomultiplier tube into which the artificial pulses were applied and an indication of count loss obtained thereby. A signal indicative to the count loss is generated and used to correct the data received in other channels corresponding to actual scintillations from the observed tissues.

Further objects, features and advantages of the invention will be apparent from the following detailed description taken together with the accompanying drawings that illustrate a preferred embodiment of a method and a device for the correction of the data obtained from a gamma ray scintillation camera for data count losses.

DESCRIPTION OF THE PREFERRED EMBODIMENT

Figure 1:
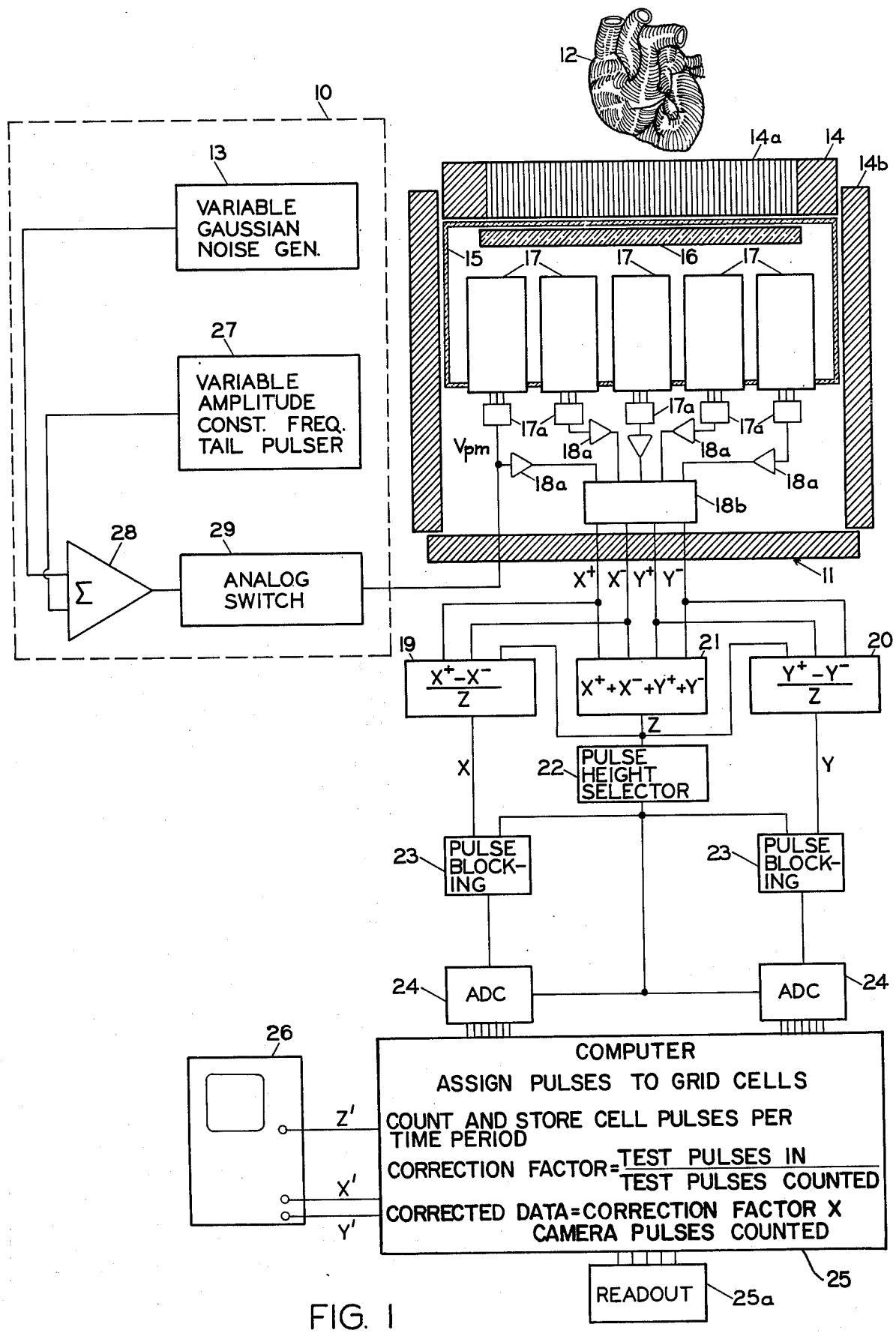
FIG. 1 is a schematic view of the circuitry for correcting data count losses in the conjunction with a gamma ray scintillation camera, processing circuitry and a data processing computer.

Referring now more particularly to the drawings, wherein like numerals refer to like parts throughout the several views, a preferred embodiment of a count loss determining device exemplifying the principles of my invention is shown generally within the dashed lines at 10 in FIG. 1. The device 10 is suitable for use with a standard gamma ray scintillation camera shown generally at 11. The gamma camera 11 is utilized to obtain pictures in vivo of the movement of radioisotope materials through the body of a subject. For example, the gamma camera may be directed to observe the passage of an intravenous injection of $^{99m}T_{cO-4}$ through the passageways of the heart, which is represented pictorially at 12 in FIG. 1.

The view of the gamma camera shown in FIG. 1 is a somewhat simplified cross sectional view of a typical gamma camera with only the more significant elements of the camera being shown therein. Gamma ray radiation emanating from the area of the heart 12 passes through a collimator 14 which consists of a slab of lead or tungsten having numerous narrow holes or channels 14a formed therein. The channels 14a allow gamma rays that are traveling in alignment with the longitudinal axis of the channels to be passed therethrough, while gamma rays which travel at an angle to the longitudinal axis of the channels will be substantially absorbed by the lead or tungsten walls of the channel. Lead shielding 14b encloses the camera to prevent the entry of stray radiation. Those gamma rays which pass through the collimator will pass through a protective glass envelope 15 and strike a solid sodium iodide (NaI) crystal 16. The gamma rays reaching the sodium iodide crystal are produced as a result of radioactive disintegrations, and consist of discrete photons. The gamma ray produces a point flash of light substantially in the visible range in the sodium iodide crystal at the position where it impinges upon the crystal, with the strength of the light emitted being proportional to the energy of the gamma ray photons that is deposited in the crystal. The visible light is emitted isotropically from the point flash, and is transmitted to an array of photomultiplier tubes 17. The photomultiplier tubes 17 are connected to circuitry 17a which provides a high voltage bias to the tubes. When visible light impinges upon the face of the photomultiplier tubes, an output voltage $V_{pm}$ is provided by the circuitry 17a. The output voltage $V_{pm}$ is provided in the form of a pulse of voltage, with the height of the pulse being proportional to the intensity of the light that strikes the photomultiplier tube, and with the width of the pulse being proportional to the length of time that the flash of light persists. In general, the flashes of light resulting from the gamma ray scintillation in the sodium iodide crystal produce short pulses of nearly uniform length. When a single point flash of light occurs in the scintillation crystal, each of the photomultiplier tubes will produce an output pulse, with the height of the output pulse from any given photomultiplier tube being proportional to the intensity of the point flash of light and to the distance of the photomultiplier tube from the point flash. Thus, while all of the photomultiplier tubes will put out a pulse of voltage when a point flash of light occurs in the scintillation crystal, the photomultiplier tube closest to the point flash will put out the largest pulse while the photomultiplier tube farthest away from the point flash will put out a much smaller pulse.

The output signals from the photomultiplier tubes are fed through isolation preamplifiers 18a into a network 18b which forms a portion of the internal circuitry of the gamma ray camera 11. The network 18b operates to the input pulses provided by all of the photomultiplier tubes to yield four output signals which are customarily denoted X+, X−, Y+, and Y−, as shown in FIG. 1. These four signals may be utilized to yield the X and Y coordinates of the point flash of light in the crystal and to determine the magnitude of the flash of light. This is done by feeding the X+ and the X− inputs into a difference circuit 19, by feeding the Y+ inputs and the Y− inputs into a difference circuit 20, and by feeding all four inputs into an addition circuit 21. The addition circuit 21 adds up all four inputs to provide a voltage signal pulse, labeled Z in FIG. 1, with the signal Z being proportional to the magnitude of the point flash of light. The difference circuit 19 subtracts the X− signal from the X+ signal and divides by the Z signal to yield a pulse output that is proportional in height to the X position of the pulse of light in a rectangular coordinate system. Similarly, the difference circuit 20 subtracts the Y− signal from the Y+ signal and divides by the Z signal to yield a signal Y which consists of pulses which are proportional in height to the Y coordinates of the point flashes of light. Since a good deal of background radiation and cosmic radiation at low levels finds its way into the gamma camera, it is desirable to be able to filter out those pulses which do not correspond to the gamma rays being emitted from the radioisotopes. It is also desirable to eliminate oversize pulses which may overload the data processing circuitry. This may be accomplished by utilizing a pulse height selector 22 which will transmit a Z pulse only if the pulse is within a pulse "window," with an acceptable pulse exceeding a predetermined threshold magnitude but being less than a predetermined maximum magnitude. The Z signal pulses which are transmitted by the pulse height selector 22 may be used, if desired, to select only those X and Y pulses which correspond to a pulse of significant magnitude by means of pulse blocking circuits 23 which may consist of a modified linear gate controlled by the Z pulse.

Since the X, Y, and Z signals are to be supplied to a digital computer, it is necessary to convert the pulses of varying magnitude to digitally encoded pulse information. This may be accomplished by means of analog-to-digital converters 24 which convert the maximum magnitude of each pulse to a binary coded pulse sequence. These binary signals are then fed into a computer 25. The Z pulse is preferably provided to the analog-to-digital converters 24 to enable the converters only when a Z pulse is present.

The computer 25 is a special purpose digital computer which has the capability of analyzing the binary information concerning each X and Y pulse and assigning each pulse a position corresponding to the cell on the grid of the gamma camera at which the point flash of light occurs. The computer also has the capability of counting the number of pulses that occur within each grid cell on the face of the camera over some given period of time and storing these counts for future reference. The computer may store this information as a "frame," consisting of the number of pulses occurring in each cell of the grid on the face of the gamma camera over the given period of time. This information may be displayed on an oscilloscope as shown in FIG. 1 by providing X' and Y' signals from the computer to the oscilloscope corresponding to the position of a cell, and providing a signal Z' which modulates the electron beam intensity of the oscilloscope. The intensity signal Z' is proportional to the number of pulses that were recorded in a given cell over the time period of the frame. A typical picture of a frame as seen on the face of the oscilloscope is shown illustratively in FIG. 3, with the picture representing passage of a radioisotope gamma ray emitting material through the chambers of the heart of a subject. The darker areas shown in FIG. 3 correspond to the heart, with the lightly scattered dots surrounding the heart corresponding to a residual level of background radiation. The encircled area labeled A in FIG. 3 corresponds to the left auricle area of the heart through which the bulk of the intravenous fluid containing the radioisotope is passing at the time that this picture has been taken. The encircled area labeled B corresponds to the left ventricle area of the heart. The computer can be instructed to compute the total pulse count of the areas contained within the encircled regions marked A and B in FIG. 3, and to plot these counts as a function of time as in FIG. 4. This information can be utilized to determine the flow rate through the auricle and ventricle and to thus display graphically the functioning of the heart muscle and the valves within the heart.

The above described operation of the gamma ray scintillation camera in conjunction with the data processing capabilities of a digital computer are well known techniques, and have been commonly utilized to provide diagnostic information to physicians in clinical situations.

Because total pulse count rate within the anatomic chamber, outlined by the user, taken as a function of time is indicative of the functioning of the observed organ, as the auricle and ventricle of a heart, the value of the information produced by the camera is degraded by any loss of count of scintillations inherent in the processing circuitry. These losses can be as high as 50% of the pulses observed. This is due to the comulative effects of data pile-up, base-line restoration and analog to digital conversion times in the processing circuitry which reduces the count "seen" by the computer.

Figure 6:
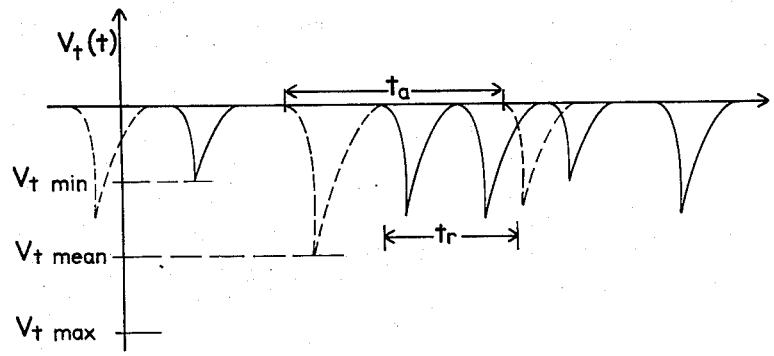
FIG. 6 illustrates the timing relationship between the artificial pulses inserted into the circuitry associated with a photomultiplier tube and pulses produced by that photomultiplier tube in response to gamma emissions.

An example of this count loss may be seen with reference to FIG. 6. In that figure the pulses illustrated in solid line represent actual pulses produced by a photomultiplier tube in response to gamma scintillation, and the time period represents the recovery time of the camera system. If two or more pulses were to occur within the time period $t_r$, as illustrated, only one would be "seen" by the system and counted.

In order to most accurately measure the amount of data lost, i.e. the tractional reduction of scintillation count, a test signal is applied to the system which closely replicates the pulses produced by the photomultiplier tubes in response to gamma scintillation in the observed tissue. The number of such artificial pulses produced in a given time frame can be monitored, and the signal indicative of the count of such pulses determined by the processing circuitry can be compared to monitor processing circuit count loss and to derive a correction factor for such losses to correct the scintillation data obtained by the camera system for the given time period.

The photopeak (Full-energy) gamma events presented to the pulse height selector (22 at FIG. 1) will be statistically distributed in a Gaussian energy distribution about a mean corresponding to the full gamma energy. The width of this distribution varies as the square root at the gamma energy. Imaging protocols dictate the window widths of the pulse height selector that have been found to provide the best performance in imaging radio traces at varying gamma energy. For greater accuracy of monitoring count loss, the artificial pulses should be in the range of amplitudes and shapes corresponding to the pulses produced by a photomultiplier tube. The artificial pulses should have variant amplitudes that occur with a statistical distribution similar to that of the scintillation energy distribution. The present invention provides means for creation of such pulses and utilizing them for determining processing circuit count loss.

Referring again to FIG. 1, the circuit 10 schematically represents the source for producing the requisite artificial pulse signals. Generally, the circuit 10 comprises a generator of variable amplitude noise 13, a pulse generator 27 producing pulses of the same general shape as photomultiplier pulses produced in the camera 11, a summing amplifier 28 which adds the signals produced by noise generator 13 and pulse source 27. Analog switch 29 conducts the output of summing amplifier 28 to the input of isolation preamplifier 18a for a period corresponding to the duration time of pulses produced by the pulse source 27, so that noise may not be introduced into the processing circuit of camera 11 from noise generator 13 between the occurrence of the artificial pulses.

In order that the artificial pulses produced by the circuit 10 closely resemble the actual pulses produced by the photomultiplier tubes in response to gamma scintillations, the amplitude of the variable-amplitude noise signal generated by source 13 must have a Gaussian distribution of amplitudes. In order that the amplitudes of the sum of the noise signal and the signal produced by source 27 fall in the rang of amplitudes produced by photomultiplier tubes 17 for a given scintillating isotope, the amplitude of the signal produced by source 27 can be adjusted.

Particular circuit embodiments capable of producing the signals and performing the functions described above are illustrated in FIG. 2. In this figure, the major components already described in FIG. 1 are shown in greater detail, i.e. circuit embodiments of noise source 13, pulse source 27, adding circuit 28 and gate 29 are shown in particular embodiments. Components of pulse source 27 are further individually exemplified in FIGS. 2a, 2b, and 2c.

Figure 2:
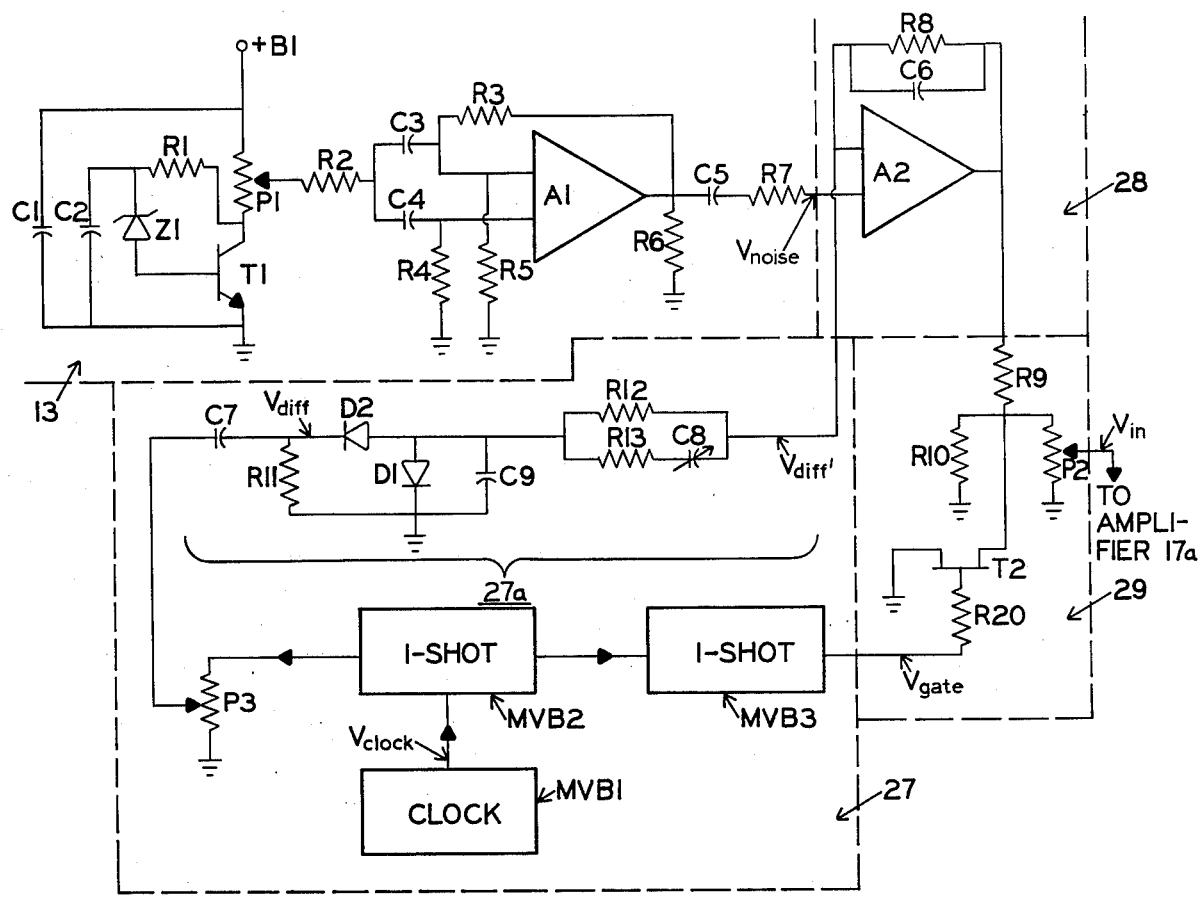
FIG. 2 is a schematic representation of the circuit for correcting data count losses.

The Gaussian amplitude-variant noise generator 13 is shown in FIG. 2 to be comprised of a zener diode $Z_1$ whose current variations are amplified by transistor $T_1$ to create a Gaussian variant output voltage across Potentiometer $P_1$. These Gaussian voltage variations are amplified in the subsequent amplifier stage comprising amplifier $A_1$ with its associated coupling impedances and feedback networks.

Figure 5:
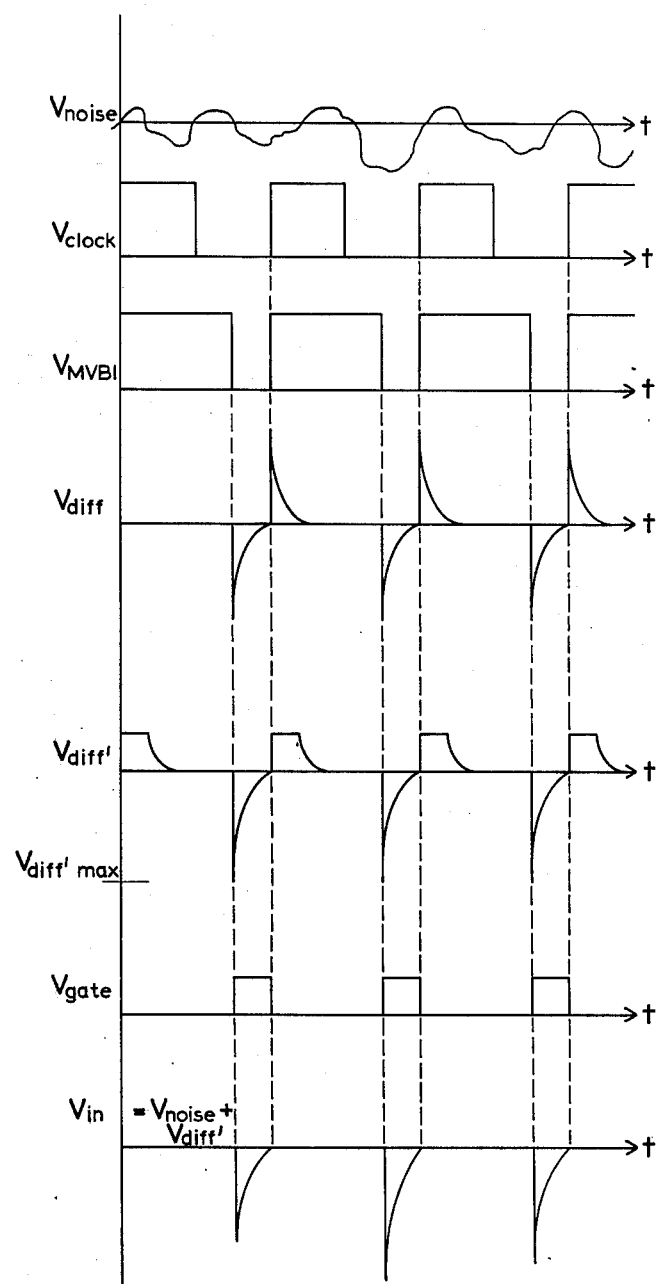
FIG. 5 represents the relation and timing of logic electrical signals obtaining at various points in the circuitry illustrated in FIG. 2.

The constant frequency source of pulses 27 comprises a clock circuit MVB1 having a base frequency of 1KH$_z$, whose output pulses trigger a 1-shot multivibrator MVB2, which in turn triggers a second 1-shot multivibrator MVB3. FIG. 5 shows the timing relationship of the output pulses of the clock (MVB1), and the first and second 1-shot multivibrators MVB2 and MVB3. The output of the second 1-shot MVB3 is used to trigger the gate 29 so that none of the noise signals produced by source 13 are introduced into the processing circuitry between pulses produced by source 27. In order that source 27 produces signals of the same general shape, the pulses produced by 1-shot MVB2 are differentiated in differentiating circuit 27a to produce a pulse having a rising leading edge and falling tailing edge as shown in FIG. 5 chosen to replicate the shape of gamma pulses generated by the phototube. The output of differentiating circuit 27a is fed to summing amplifier circuit 28 together with the output of the Gaussian noise circuit 13. Here these signals are added to form a signal having amplitudes varying in a random manner but of a Gaussian statistical distribution of amplitudes, of mean value set by potentiometer $P_2$, with the fractional amplitude variation set by the ratio of potentiometers $P_1$ and $P_3$.

In order that the noise produced by source 13 be prevented from entering the processing circuitry of the gamma camera, gate 29 is provided to prevent the input of any signals during the time that the 1-shot MVB2 has zero output voltage, i.e. when there is no output voltage from differentiating circuit 27a. To accomplish this, unijunction transistor $T_2$ is provided whose source is connected to the output of adding circuit 20 and whose drain is grounded. The gate of $T_2$ is energized and $T_2$ rendered nonconductive by a pulse from MVB3. With $T_2$ conducting, any output signal of circuit 28 is grounded through $T_2$. $T_2$ is rendered nonconductive at the time another pulse is produced by MVB2 and any output of circuit 28 is routed via potentiometer $P_3$ to the processing circuit of the camera as described in reference to FIG. 1.

Figure 5A:
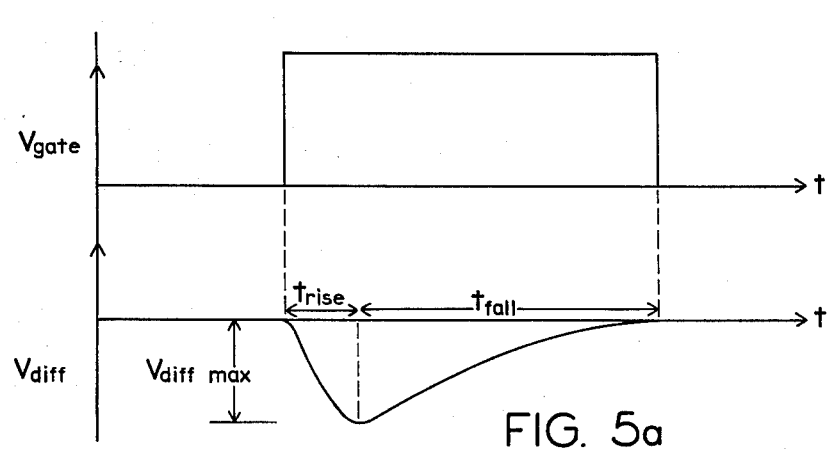
FIG. 5a shows an expanded time scale view of a negative pulse inserted into the processing circuit for a photomultiplier tube and illustrates the timing relationship between this pulse and the pulse controlling the timing of a gate allowing the insertion of the pulse.

The pulse waveforms of FIG. 5 and of FIG. 5a show that the gate of $T_2$ is energized with a pulse V gate for such a time that only the negative going portion of the differentiated pulses V diff from MVB2 are allowed to pass into the camera processing circuitry. The multivibrator MVB3 thus can be triggered to fire on the trailing edges of the pulses produced by MVB2 and the duration of the V gate pulses should be adjusted to coincide with the width of the negative "spikes" of V diff as shown in the expanded-time base view in FIG. 5a.

Referring now with greater particularity to the circuit illustrated in FIG. 2, in the noise generator 13, zener diode $Z_1$ whose current is amplified by the transistor $T_1$, may be replaced by any p-n junction back-biased into conduction. Thus one junction of a transistor, or another type of diode may be used to produce noise having varying amplitudes in a Gaussian statistical distribution.

The variation of the amplitudes of the noise produced by generator 13 should be constrained to occur within given limits which depend on the height of the pulse spike V diff. This height may be determined by the type of isotope used which causes the gamma scintillations. That is, this height must be adjusted to the mean maximum voltage value of the "spikes" produced by the photomultiplier tubes in response to gamma radiation of a given isotope. This height can be controlled by adjusting potentiometer $P_3$. The noise variation must be within a limit proportional to the square root of this mean pulse "spike" height, and is adjustable by potentiometer $P_1$.

The rise and fall times ($t_{rise}$ and $T_{fall}$) of the V diff spikes shown in FIG. 5a must also be adjusted to coincide with the shape of pulses produced in the photomultiplier tubes by gamma scintillation. This times $t_{rise}$ and $T_{fall}$ can be adjusted by varying capacitance C8 in differentiating circuit 27a.

The frequency of the noise produced by circuit 13 should be of a frequency greater than that of the clock pulses, V clock, but should have no frequency component with a period less than the duration of the "spikes" V diff. Thus for typical values, i.e. clock pulse rate of 1000/sec, and a spike duration of about 50 $\mu$ sec, there should be no noise component of greater frequency than about 10KHz. With this in mind, the circuitry associated with amplifier $A_1$ have been designed, and the amplifier component $A_1$ has been selected such that frequency components greater than 10KHz are eliminated from the noise signal before being passed to adding circuit 28.

Figure 2A:
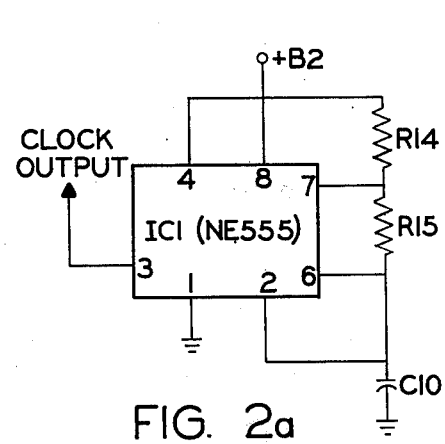
Figure 2B:
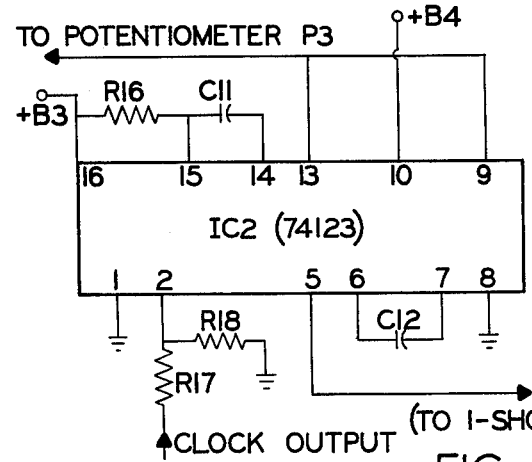
Figure 2C:
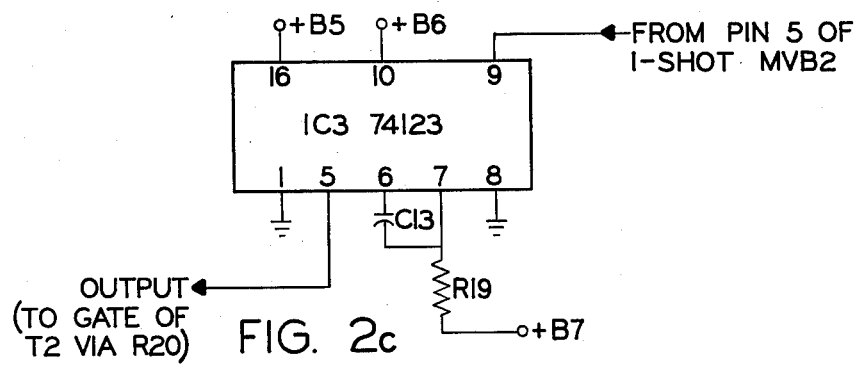

Particular embodiments of the clock MVB1 and 1-shots MVB2 and MVB3 are illustrated in FIGS. 2a, 2b and 2c respectively. Each of these circuits can be constructed from commerically-available integrated circuit devices as shown.

For example, the clock MVB1 can be realized as shown in FIG. 2a and comprise an integrated circuit ICI (commericially available NE555) having its 2 and 6 pins connected to ground by a capacitor C10, pin 1 being connected directly to ground. Between pins 8 and 7 and 7 and 6 are connected resistances R14 and R15 respectively. Pins 4 and 8 of ICI are connected to a bias voltage source B2.

The 1-shot MVB2 may be realized as shown in FIG. 2b, from an integrated circut IC2 (which is commerically available 74123) comprising a pair of 1-shot multivibrator circuits. In the configuration shown, pins 1 and 8 are grounded, 6 and 7 connected by a capacitance C12, 14 and 15 by a capacitance C11, and 15 and 16 by resistance R16. The integrated circuit IC2 receives input pulses from the clock output (pin 3 of ICI) via R17 at pin 2. Shunting resistance R18 is connected between pin 2 and ground. Pins 10 and 16 are connected to d.c. voltage bias sources B4 and B3 respectively. The circuit arrangement of FIG. 2b has two outputs; the first, taken at a connection between pins 9 and 13 is a pulse train triggered by the leading edge of the clock pulses at pin 2, which pulse train is differentiated in circuit 27a to form the "spike" pulses Vdiff and Vdiff' shown in FIGS. 5 and 5a.

The second output, taken at pin 5 is a pulse train, the leading edge of which pulses trigger the second 1-shot MVB3. Relative to the output at pins 13 and 9, this pulse train can be delayed or advanced by choice of capacitor C12 to ensure that the pulse output of MVB3 causes the transistor $T_2$ to conduct the negative "spikes" of Vdiff to the processing circuitry, i.e. so that V gate and Vdiff are time-coincident as has been previously developed with reference to FIG. 5a.

The second 1-shot MVB3 shown in FIG. 2c is also comprised of an integrated circuit IC3 (which is also a commerically available 74123) whose output is taken at pin 5 and whose input is received at pin 9 from pin 5 of IC2. The output V gate of MVB3 is a pulse train for controlling the conduction of transistor $T_2$ and this pulse train is leading edge triggered by the output of IC2. In FIG. 2c, pins 6 and 7 are connected by capacitor C13, pin 7 also being connected to a source of d.c. bias voltage B7 by a resistance R19. Pins 16 and 10 are connected to d.c. bias voltage sources B5 and B6 respectively. The duration of the V gate output pulses of MVB3 can be controlled by adjusting the capacitance value of C13 so that the pulses V gate and the negative "spike" pulses of Vdiff are of the same time duration.

For the circuit illustrated in FIGS. 2 and 2a, 2b and 2c, the following table give exemplary values for the components illustrated.

Table 1

| Amplifiers | Diodes |
|---|---|
| $A_1$ LM 501 | $Z_1$: (4.3 V) |
| $A_2$ LM 318 | $D_1$: IN914 |
| | $D_2$: IN914 |
| Capacitors | |
| | Resistors |
| C1: 500 μf | |
| C2: 10 μf | R1:68K |
| C3: .002 | R2:5K |
| C4: .1 | R3:800K |
| C5: 800 pf | R4:10K |
| C: 10 pf | R5:1K |
| C7: 650 pf | R6:680 |
| C9: 50 pf | R7:15K |
| C10: 0.0066 | R8:150K |
| C8: 3–15 pf | R9:2700 |
| C11: 0.022 | R10:82K |
| C12: 50 pf | R11:5600 |
| C13: 390 pf | R12:100K |
| | R13:12K |
| Potentiometers | R14:5K |
| | R15:105K |
| $P_1$:5K | R16:82K |
| $P_2$:100K | R17:2200 |
| $P_3$:250 | R18:1200 |
| | R19:120K |
| Integrated Circuits | R20:39K |
| IC1:NE555 | Voltages (d.c.) |
| IC2:74123 | |
| IC3:74123 | B1: 15v+ |
| | B2:12v+ |
| Transistors: | B3:5v+ |
| | B4:Vx+ |
| T1:2N5135 | B5:5v+ |
| T2:4016 (Motorola) | B6:5v+ |

The artificial pulses produced by the circuit 10, i.e. the $V_{in}$ "spike" pulses of FIG. 5 are preferably supplied to the output circuitry of a single selected photomultiplier tube with the computer assigning these pulses to a single cell of the camera face grid.

Figure 3:
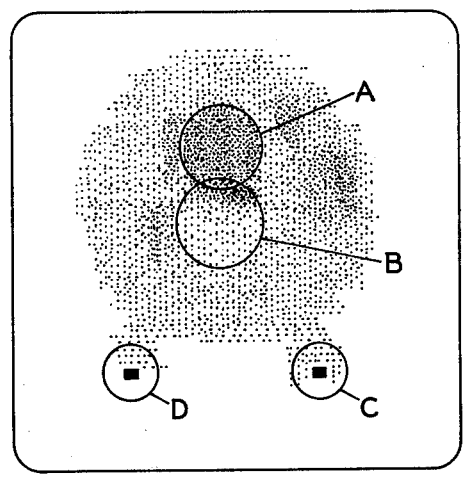
FIG. 3 illustrates pictorially a gamma ray camera scintillation picture as shown in an oscillographic display as provided by gamma ray scintillation data from the computer.

If the photomultiplier tube selected is one of the outer ring of photomultiplier tubes, the cells so chosen will be outside the camera field of view. As FIG. 3 shows the outer portions rarely or never are found to have gamma ray induced flashes occurring at these points. This ordinarily unused space exists because the computer core reserved for image storage is divided into a rectangular coordinate system, whereas the scintillation crystal is circular, leaving a dead space between the crystal and the boundaries of the rectangular coordinate system. Thus, supplying the artificial spike signals to the output circuitry of a single outer photomultiplier tube will not substantially interfere with the recording of gamma ray scintillation data.

As seen in FIG. 3, the artificial $V_{in}$ signals provided to a selected outer photomultiplier tube output circuit results in the placement of this signal information in the area labelled C. Physiological data multiplexed in the manner described in the forementioned copending application appears in the area labelled D.

Figure 4:
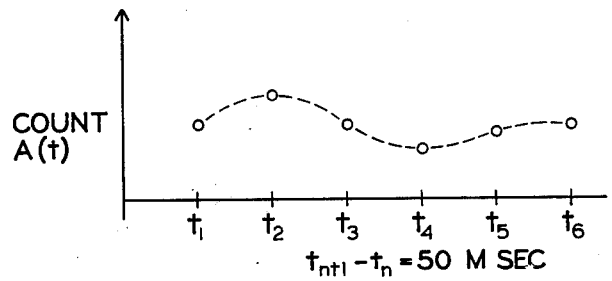
FIG. 4 shows an illustrative representation of the data obtained from the gamma ray scintillation camera for a given location of the subject tissue analyzed for particular time segments.

The computer may be commanded to analyze the encircled areas A, B, C and plot the count of scintillations as a function of time on a read-out device 25a, which may be a line printer or strip chart recorder, or on an oscilloscope, where a photograph may be made of the plot. FIG. 4 shows an example of such a plot for data frames separated by 50 μ millisec. for the area A. FIG. 4(b) shows a plot for area C which represents counts of the artificial pulses taken for the same frames and in synchronism with the count plot of FIG. 4.

Figure 4A:
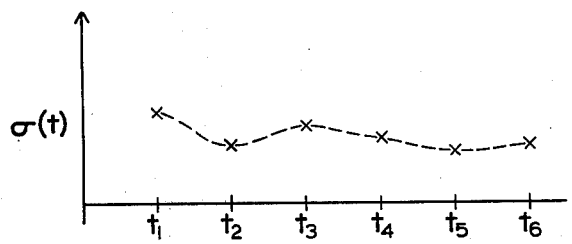
FIG. 4a shows a signal correcting for data loss and FIG. 4b shows a corrected representation of scintillation data taking into account data loss for particular time segments.
Figure 4B:
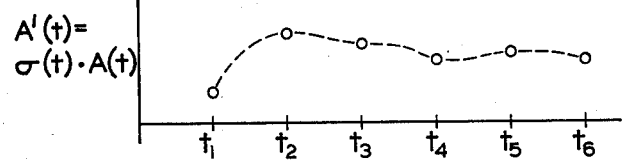

The computer can be utilized to calculate an error function from the data displayed in FIG. 4a for correcting of FIG. 4 in synchronism with the data. This may be done by dividing the known rate of pulses $V_{in}$ (which is generally the same pulse rate as the clock) by the number of such pulses counted by the computer corresponding to the selected pulses region of interest D of FIG. 3 during each frame, dividing this number by the time of frame repetition. This gives a correction factor for each frame that the computer can multiply by the count in the selected area of interest (such as A) to give more accurate data of the true count of actual scintillations occurring in the region of interest for each frame in FIG. 4b.

Such corrected data is shown in FIG. 4b plotted in synchronism with the date of FIG. 4. Such a plot can be accomplished by the computer in like manner to the plot of FIG. 4.

While having shown and described a particular embodiment of this invention, it is to be understood that various modifications and changes may occur to those skilled in the art without departing from the spirit and scope of the invention as defined in the appended claims.

I claim:

1. Method of correcting for transmission losses in a measurement system employing a plurality sensor of physical phenomena and circuitry for processing signals produced by each sensor indicative of the number and magnitude of occurrences of the phenomena in a given time period, said method comprising:
   a. artificially creating a signal having a fixed-frequency of repetition and a shape similar to the shape of the signals produced by the sensors in response to the physical phenomena and in which the amplitudes of the pulses vary in such a fashion as to have amplitudes which fall in the range of amplitudes and having a statistical distribution of amplitudes that is normally produced by said sensors;
   b. applying said artificial signal to the processing circuitry in a manner so as to distinguish said artificial signals from normal data signals produced by said sensors;
   c. deriving a signal indicative of the ratio of the number of pulses of said artificial signal transmitted by said processing circuitry to the number of said pulses applied to said processing circuit in said given time period.
   d. dividing said signals produced by said sensors by said signal indicative of said ratio to produce a data signal corrected for losses occurring in said processing circuit during said given time period.

2. The method of claim 1 wherein said artificial signals are produced by:
   a. generating a signal having fixed amplitude fixed frequency pulses;
   b. shaping said pulses to a shape similar to the pulses normally produced by said sensors;
   c. adding to said shaped pulses a signal whose amplitude varies slowly in comparison to the frequency of said fixed amplitude fixed frequency signal and varies with time so as to have the same statistical distribution of amplitudes as data signals produced by said sensors.

3. A method of correcting for data count losses in the scintillation data produced by processing circuitry associated with a gamma ray scintillation camera said camera having an array of photomultiplier tubes producing output pulses in response to scintillations of radioactive isotopes in an object observed by said camera said scintillation data thereby being indicative of the number of scintillations sensed by each photomultiplier tube in a given time period, said photomultiplier tube output pulses having a given statistical distribution of magnitudes corresponding to the statistical distribution of energies of the scintillations sensed by said photomultiplier tubes, said processing circuit including means for counting the number of data pulses corresponding to each photomultiplier tube created by gamma ray scintillations sensed by the photomultiplier tubes in said given time period, said method comprising:
   artificially generating a series of pulses having the same general shape as the pulses produced by said photomultiplier tubes in response to said scintillations by
   generating a signal composed of amplitude varying noise whose amplitude varies such that the statistical distribution of noise amplitudes is the same as the statistical distribution of amplitudes of the signals generated by the photomultiplier tubes in response to gamma ray scintillations,
   generating a constant frequency constance amplitude signal of the same general shape as the signals generated by the photomultiplier tube in response to gamma ray scintillations and
   combining the amplitude varying noise signal with said constant amplitude constant frequency signal such that the amplitude of the combined signals falls within the range of amplitudes produced by said photomultiplier tubes in response to said gamma ray scintillations,
   inserting said combined signals into a selected channel of said camera corresponding to the processing circuitry associated with one photomultiplier tube in the peripheral of the field of view of said camera,
   counting the number of pulses so inserted in a given time period,
   deriving a signal proportional to said counted number of said combined signals so injected,
   deriving a signal proportional to the number of pulses counted by said counting means that are associated with said selected channel in said given period of time,
   deriving a signal indicative of the ratio of the number of inserted pulses to the count obtained by said counting means for said selected channel in said given period of time, and
   multiplying the count of pulses determined by said counting means for each photomultiplier tube in said given period of time by said signal indicative of said ratio.

4. An apparatus for determining the loss of count of scintillations in the processing circuitry associated with a gamma ray scintillation camera having an array of photomultiplier tubes for detecting gamma ray scintillations from radioisotopes present in regions of an object observed by said camera and having a counting means for determining the number of signals produced by said processing circuit for each photomultiplier tube, said apparatus comprising:
   a source of varying amplitude signals having a statistical distribution of amplitudes similar to the distribution of energy of gamma ray scintillation deteted by said photomultiplier tubes,
   a source of adjustable amplitude fixed frequency pulses having a shape similar to that of the pulses produced by said photomultiplier tubes in response to detected gamma ray scintillations,
   means for adding to said fixed frequency pulses said varying amplitude signal and for applying the resulting signal to the processing circuitry associated with a selected one of said photomultiplier tubes and means for determining in a given time period the number of pulses produced by said source of fixed frequency pulses and the number of pulses recorded by the counting means for said photomultiplier tube.

5. The apparatus of claim 4 wherein said processing circuitry of one of said photomultiplier tubes is associated with a photomultiplier tube on the periphery of the array of photomultiplier tubes of said camera.

6. The apparatus of claim 4 wherein the source of amplitude varying noise includes a pn junction back-biased into conduction, means for amplifying the current flowing through said junction, and means for filtering said amplified currents to remove currents having frequencies higher than the rate of repetition of said adjustable amplitude fixed frequency pulses.

7. In a gamma ray scintillation camera for producing images of an object in response to scintillations of radioactive trace elements in said object, said camera having an array of scintillation detectors and circuitry for processing and displaying an image from the number and intensity of scintillations detected by said detectors for each of a plurality of given time periods, said processing circuitry including means for storing data indicative of the number and intensity of scintillations detected by each detector in each said predetermined time period, apparatus for determining the loss of count of scintillation in said predetermined time period in said processing network, said apparatus comprising:

means for producing a pulse train of a given repetition rate and having time-variant amplitudes that are of a magnitude and statistical distribution similar to the statistical distribution and magnitude of energies of the scintillation detected by said detectors, means for applying said pulse train to the portion of the processing circuits associated with a selected one of said detectors, means for determining the number of such pulses, counted by said processing circuit and stored as data in said data storage means, for said selected detector for each of said time periods, and means for deriving a correction factor indicative of the ratio the number of said pulses counted to the number of said pulses produced for each time period of said plurality of time period and means for multiplying the correction factor times the count of scintillation detected and counted by said processing circuitry for each time period.

8. The apparatus of claim 7 wherein said means for producing said pulse train comprises:

a source of constant frequency, constant amplitude square pulses, a differentiating circuit for differentiating said constant amplitude constant frequency square pulses, a source of amplitude-variant voltage whose magnitude varies slowly in comparison to the frequency of said constant amplitude constant frequency square pulses and varies according to a statistical distribution similar to the statistical distribution of scintillation energies detected by said detectors.

9. The apparatus of claim 8 including means for adding said differentiated pulses to said amplitude-variant voltage and means for applying said added pulses and voltage to the processing circuitry associated with said selected one detector only during the time corresponding to the pulse duration of said constant-frequency, constant-amplitude square pulses.

10. The apparatus of claim 9 wherein said statistical distribution is gaussian and said source of amplitude-variant voltage includes a pn junction back-biased into conduction.

11. The apparatus of claim 10 wherein the source of constant amplitude constant frequency square pulses comprises a clock circuit and a one-shot multivibrator which produces pulses triggered by pulses produced by the clock circuit.

12. An apparatus for determining the loss of count of scintillations in the processing circuitry associted with a gamma ray scintillation camera having an array of photomultiplier tubes for detecting gamma ray scintillations from radioisotopes present in regions of an ojbect observed by said camera and having a counting means for determining the number of signals produced by said processing circuit for each photomultiplier tube, said apparatus comprising:

means for generating an artificial signal composed of pulses having time variant amplitudes that fall within the range of amplitudes of signals normally produced by said photomultiplier tubes in response to said gamma ray scintillations said time-variant amplitudes having the same statistical distribution as the amplitudes of said normally-produced signals, said artificial signals having the same shape as said normally produced signals means for applying said artificial signal to the processing circuitry associated with a selected one of said photomultiplier tubes and means for determining in a given time period the number of pulses produced by said source of fixed frequency pulses and the number of pulses recorded by the counting means for said photomultiplier tube.

* * * * *